May 19, 1953  H. N. SNYDER  2,638,833
VENTILATOR ATTACHMENT FOR AUTOMOBILES
Filed Feb. 18, 1950
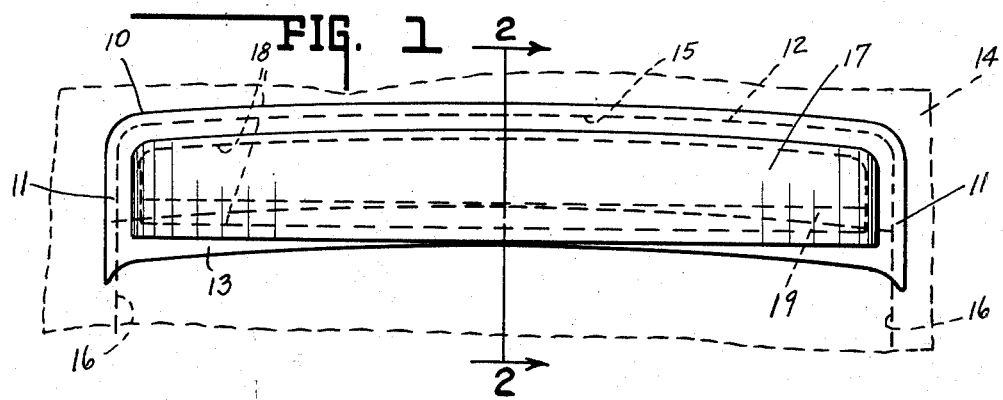
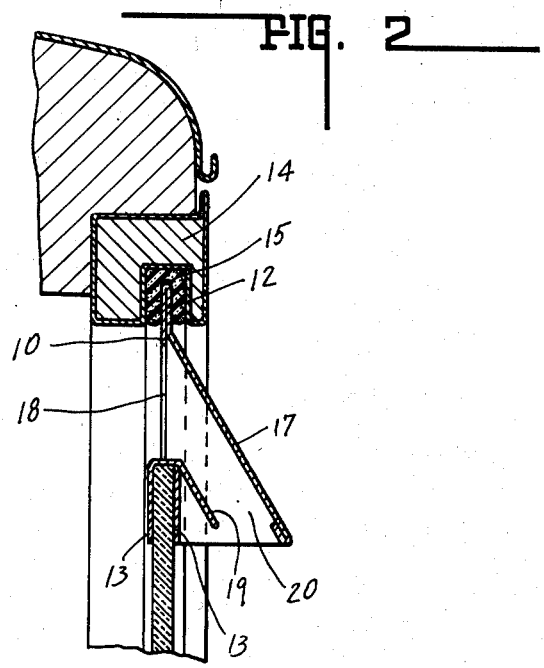
INVENTOR.
HARRY N. SNYDER.
BY
Lockwood, Goldsmith & Galt,
ATTORNEYS.

Patented May 19, 1953

2,638,833

UNITED STATES PATENT OFFICE 2,638,833

VENTILATOR ATTACHMENT FOR AUTOMOBILES

Harry N. Snyder, Indianapolis, Ind.

Application February 18, 1950, Serial No. 144,901

1 Claim. (Cl. 98—2)

This invention relates to a ventilator attachment for an automobile.

It is the primary object of this invention to provide means for increasing the volume of air travelling through an automobile heater, particularly of the fresh air type, and as a consequence thereof to gain better distribution of the heated air throughout the entire automobile. This object is desirable for the reason that present day heaters do not succeed in uniformly distributing heated air. It is a well known fact that the front of an automobile may be comfortable from a temperature point of view at a time when the rear is not so.

It is a further object of this invention to provide means for increasing the volume of air travelling through an automobile heater so that the temperature of the automobile interior will be raised more rapidly. Most automobile heaters in use today succeed in heating the interior thereof but not as soon as desired. This fact is an undesirable one to the millions of drivers whose homes are from five to fifteen minutes or so from their place of business. In winter months it is not uncommon for the automobile interior to have a comfortable temperature for the first time, just as the driver arrives at his destination. Through the use of the present invention, this unsatisfactory condition will be alleviated. In effect the invention acts as a heater "booster." The reasons are apparent. In any enclosed space the entrapped air will in time attain a state of static equilibrium. If an avenue of escape is provided, as in the present invention, there is an "unbalancing" of this state of equilibrium. Since the air has a tendency to stabilize and once again attain a state of equilibrium, circulation of the air within the interior of the automobile necessarily results.

It is a still further object of this invention to provide an attachment which will serve as a pressure release medium to facilitate the closing (particularly in winter months when the windows are closed) of the car doors. It is well recognized that when the windows of an automobile are closed, it is always difficult to close the doors. This results from the fact that the closing of the door compresses the air entrapped within the automobile since there is no avenue of escape therefor. With the present invention an avenue of air escape is provided and the doors may be closed with ease.

It is a still further object of this invention to provide an attachment of such character and construction that a minimum amount of outside air is permitted to enter the interior of the automobile, while at the same time an ample amount of inside air is capable of escaping to the outside of the automobile to accomplish the foregoing objectives.

It is a still further object of the present invention to provide an attachment which will reduce the amount of condensation which forms on automobile windows, particularly in winter months and when several passengers are riding.

It is a still further object of this invention to provide an attachment which will accomplish all of the foregoing objectives and yet which is nonetheless simple in construction and inexpensive in price.

The invention is also of advantage in hot weather driving, in that this attachment causes the hot air within the car to be sucked or drawn therefrom while travelling, in the nature of a flue. As the hot air is withdrawn, entry of fresh outside air through the usual forward ventilators is facilitated.

The full nature of the invention will be understood from the accompanying drawings and the following description and claim.

In the drawings Fig. 1 is a side elevation view of the invention.

Fig. 2 is a vertical section view thereof taken on lines 2—2 of Fig. 1 in the direction of the arrows.

In the drawings 10 shows generally the elongated frame of the attachment. This frame comprises the sides 11, the arcuate or longitudinally rounded top 12 and the inverted U-shaped bottom or channel 13. The contour of the top together with the overall length of the attachment is dictated by the configuration of the frame of the particular window of an automobile in which the attachment is used. This will preferably but not necessarily, be any of the rear window frames. Since the dimensions of these rear frames differ, it will, of course, be necessary for the manufacturer to construct several sizes of attachments. The purchaser will then buy the size which conforms to the dimensions of the window frame with which he intends to use it.

At 14 is shown the rear window with which the attachment is associated. The recess formed in the top of the window frame and designed under normal circumstances to receive and accommodate therein the top of the window when the window is "rolled up" is shown at 15. Within this recess the arcuate top portion of the frame is friction fitted, it, of course, being necessary as aforesaid, first to form the top portion to such dimensions, both cross-sectional and longitudinal, that it will be receivable within said recess. In addition, the sides of the attachment are so constructed that they may be readily positioned in friction fitting relation within the recesses 16 formed at the sides of the window frame.

Extending downwardly and outwardly from the arcuate top portion is a louver hood 17 which is of such a length that it extends below the opening 18 defined by the frame of the attachment. This louver serves as a shield to keep elements such as rain and snow from entering the automobile through the opening. Furthermore, it makes difficult the passage of outside air into the interior of the automobile.

Extending downwardly and outwardly from the top portion of the substantially inverted U-shaped frame member 13 is the auxiliary louver 19. This louver is inclined at an angle substantially parallel to the degree of inclination of louver 17. The combination of the two louvers forms a passage 20 through which air exhausted from the interior of the automobile escapes after passing through the opening 18. By reason of the provision of auxiliary louver 19, extending downwardly as it does at an angle from the top portion of member 13, it is difficult for outside air to enter the interior of the automobile. Air that strikes the window and the outside wall of member 13 is deflected downwardly by the auxiliary louver which in large measure keeps the air from entering the interior of the car through passage 20 and opening 18.

Furthermore, by having the free end of louver 17 terminate at a point below the free end of auxiliary louver 19, the entrance of outside air through passage 20 and opening 18 is further restricted. At the same time the exhaustion of air from the interior of the automobile is unimpeded.

While the invention has been illustrated and described in its preferred embodiment in the drawings and foregoing description, it is to be considered as illustrative and not restrictive in character.

The invention claimed is:

In combination with an automobile window and a frame therefor having window receiving recesses formed therein, a ventilator comprising a frame having an opening therethrough extending substantially from edge to edge thereof, said frame including top and side portions adapted to be inserted in friction fitting relation within said recesses, said frame also including a bottom portion comprising an inverted channel having spaced apart side walls adapted to receive and embrace the top portion of said window, a louver connected to and extending outwardly and downwardly from adjacent the top portion of said frame and said opening to a point below the plane of the lower edge of said opening, said louver being substantially coextensive with said frame, and a second louver substantially coextensive with said frame and extending outwardly and downwardly from adjacent the top edge of said channel and the lower edge of said opening to a point above the point of termination of said first mentioned louver, the two louvers being substantially parallel thereby to provide unobstructed and continuous downward flow of air from within said window.

HARRY N. SNYDER.

References Cited in the file of this patent
UNITED STATES PATENTS

| Number | Name | Date |
|---|---|---|
| 1,660,893 | Smith | Feb. 28, 1928 |
| 1,785,891 | Danat | Dec. 23, 1930 |
| 1,847,861 | Bradbury | Mar. 1, 1932 |
| 1,967,504 | Gaughran, Jr., et al. | July 24, 1934 |
| 2,017,996 | Stonehouse | Oct. 22, 1935 |

FOREIGN PATENTS

| Number | Country | Date |
|---|---|---|
| 44,949 | Denmark | Dec. 7, 1931 |
| 577,367 | Great Britain | May 15, 1946 |